(12) United States Patent
Ahn (10) Patent No.: US 12,305,367 B2
(45) Date of Patent: May 20, 2025

(54) LOADING WEIGHT MEASUREMENT METHOD OF CONSTRUCTION MACHINE

(71) Applicant: HD HYUNDAI INFRACORE CO., LTD., Incheon (KR)

(72) Inventor: Hyeonsik Ahn, Seoul (KR)

(73) Assignee: HD HYUNDAI INFRACORE CO., LTD., Incheon (KR)

( * ) Notice: Subject to any disclaimer, the term of this patent is extended or adjusted under 35 U.S.C. 154(b) by 624 days.

(21) Appl. No.: 17/639,616

(22) PCT Filed: Aug. 26, 2020

(86) PCT No.: PCT/KR2020/011390
§ 371 (c)(1),
(2) Date: Mar. 2, 2022

(87) PCT Pub. No.: WO2021/045435
PCT Pub. Date: Mar. 11, 2021

(65) Prior Publication Data
US 2022/0333354 A1 Oct. 20, 2022

(30) Foreign Application Priority Data
Sep. 2, 2019 (KR) .................. 10-2019-0108103

(51) Int. Cl.
*E02F 9/26* (2006.01)
*G01G 19/08* (2006.01)
(52) U.S. Cl.
CPC ............. *E02F 9/26* (2013.01); *G01G 19/08* (2013.01)
(58) Field of Classification Search
CPC .......... E02F 9/26; G01G 19/08; G01G 19/083
See application file for complete search history.

(56) References Cited

U.S. PATENT DOCUMENTS 8,660,758 B2 * 2/2014 Janardhan .............. B25J 9/1638
177/139
2009/0228394 A1 * 9/2009 Mintah ................... E02F 9/264
705/50

(Continued)

FOREIGN PATENT DOCUMENTS

DE 11 2009 000 522 T5 2/2011
DE 10 2016 011 530 A1 3/2018

(Continued)

OTHER PUBLICATIONS

International Search Report issued on Nov. 30, 2020, for corresponding International Patent Application No. PCT/KR2020/011390, along with an English translation.

(Continued)

*Primary Examiner* — Natalie Huls
(74) *Attorney, Agent, or Firm* — Hauptman Ham, LLP (57) ABSTRACT

In a method of measuring weight of a load in a construction machine, weight of a load loaded in a bucket is measured while performing a construction work using a working apparatus of the construction machine. Whether or not a bucket unloading condition is satisfied is determined at any point in time during the construction work. A link parameter is calculated using output values collected from sensors attached to the construction machine when the bucket unloading is satisfied. A difference between the calculated link parameter (hereinafter, referred to as a new link parameter) and a link parameter that has been used to measure the weight of the load (hereinafter, referred to as a previous link parameter) is compared, to update the previous link parameter with the new link parameter.

8 Claims, 4 Drawing Sheets

(56) References Cited

U.S. PATENT DOCUMENTS

2017/0131134 A1\* 5/2017 Kang .................. G01G 19/025
2017/0370075 A1\* 12/2017 Leslie ................. G01G 19/083
2019/0345697 A1\* 11/2019 Ishihara ................. E02F 9/264
2023/0384146 A1\* 11/2023 Ji ........................... G01G 23/01

FOREIGN PATENT DOCUMENTS

| | | | | |
|---|---|---|---|---|
| JP | 2000-131126 A | 5/2000 | | |
| JP | 2010-243305 A | 10/2010 | | |
| KR | 10-1999-0032896 A | 5/1999 | | |
| KR | 10-2017-0053909 A | 5/2017 | | |
| WO | WO-2020003618 A1 \* | 1/2020 | .............. | E02F 3/283 |

OTHER PUBLICATIONS

Written Opinion issued on Nov. 30, 2020, for corresponding International Patent Application No. PCT/KR2020/011390.
Wonseok Son et al., "Development of multi-body dynamics model for verification of excavator HILS model", Spring and Fall Conference of the Korean Society of Mechanical Engineers, Dec. 2018, pp. 1443-1447, along with an English Abstract
Office Action issued on Jan. 17, 2025 for corresponding German Patent Application No. 112020004149.2, along with an English translation. (4 pages).

\* cited by examiner

LOADING WEIGHT MEASUREMENT METHOD OF CONSTRUCTION MACHINE

TECHNICAL FIELD

The present invention relates to a loading weight measurement method of a construction machine. More particularly, the present invention relates to a method of measuring weight of a load while a construction machine such as an excavator performs a work.

BACKGROUND ART

In order to effectively perform work of a construction machine, weight of a load may be measured, and an error in the weight value of the load may occur due to various factors such as a type exchange of a working apparatus of the construction machine, accumulation of use period, temperature change, etc. At this time, in order to reduce this error, a user of the construction machine should perform calibration of a loading weight measurement system periodically or as needed. Since this calibration work requires additional time other than a construction work, there is a problem in that the work time increases.

DISCLOSURE OF THE INVENTION

Problems to be Solved

An object of the present invention provides a method of measuring weight of a load in a construction machine.

Means to Solve the Problems

According to example embodiments, in a method of measuring weight of a load in a construction machine, weight of a load loaded in a bucket is measured while performing a construction work using a working apparatus of the construction machine. Whether or not a bucket unloading condition is satisfied is determined at any point in time during the construction work. A link parameter is calculated using output values collected from sensors attached to the construction machine when the bucket unloading is satisfied. A difference between the calculated link parameter (hereinafter, referred to as a new link parameter) and a link parameter that has been used to measure the weight of the load (hereinafter, referred to as a previous link parameter) is compared, to update the previous link parameter with the new link parameter.

In example embodiments, determining whether the bucket unloading condition is satisfied may include determining that the bucket unloading condition is satisfied when no load is loaded in the bucket or an external force is not acting on the working apparatus.

In example embodiments, determining whether the bucket unloading condition is satisfied may include comparing the new link parameter calculated through the output values from the sensors with the previous link parameter.

In example embodiments, calculating the new link parameter when the bucket unloading is satisfied may include collecting the output values from the sensors when the working apparatus is operating, and calculating the new link parameter by applying the collected output values to a dynamic equation.

In example embodiments, calculating the new link parameter when the bucket unloading is satisfied may include collecting the output values from the sensors in a plurality of operation states of the working apparatus, and calculating the new link parameter by applying the collected output values to a dynamic equation.

In example embodiments, the sensors may include pressure sensors for measuring head-side pressure and rod-side pressure of each of cylinders of the working apparatus.

Effects of the Invention

According to example embodiments, in a method of measuring weight of a load in a construction machine, the construction machine may automatically perform calibration while performing a construction work. Accordingly, since a user of the construction machine does not need to manually perform the calibration work, and may not additionally perform the calibration work other than the construction work, it may be possible to effectively perform the work while shortening the construction work time.

However, the effect of the invention may not be limited thereto, and may be expanded without being deviated from the concept and the scope of the present invention.

BEST MODE FOR CARRYING OUT THE INVENTION

With respect to example embodiments of the present invention disclosed in the text, specific structural or functional descriptions are only exemplified for the purpose of describing particular example embodiments only, and example embodiments may be embodied in many different forms and is not intended to be limiting of example embodiments.

Since the present invention can have various changes and can have various forms, specific embodiments are illustrated in the drawings and described in detail in the text. However, this is not intended to limit the present invention to the specific disclosed form, it should be understood to include all modifications, equivalents and substitutes included in the spirit and scope of the present invention.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferable embodiments of the present invention will be explained in detail with reference to the accompanying drawings. Like reference numerals in the drawings denote like elements, and thus their description will be omitted.

Figure 1:
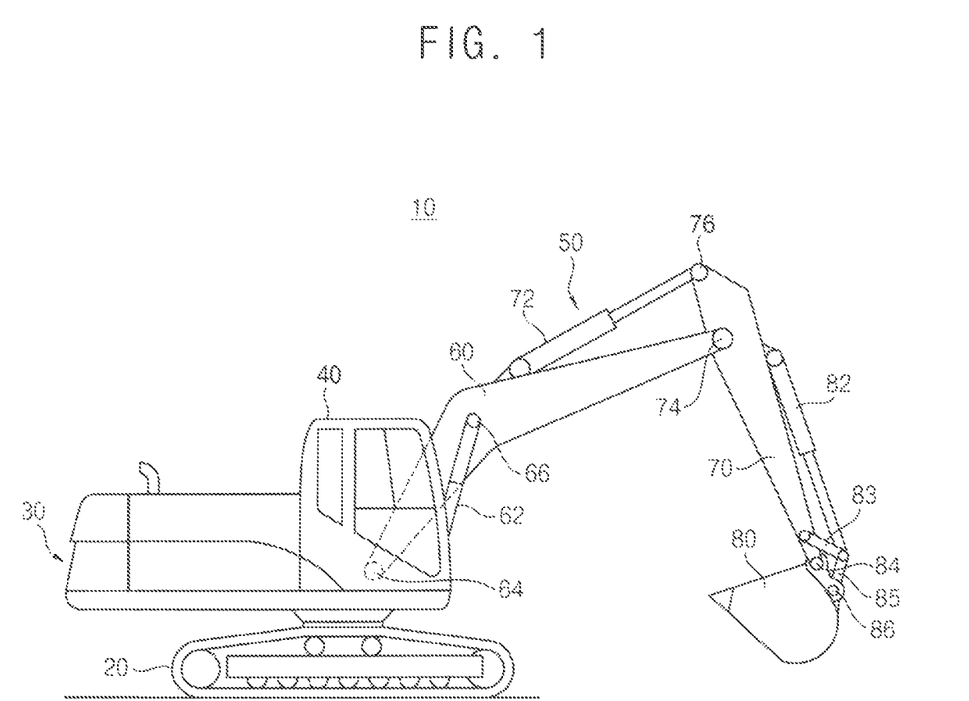
FIG. 1 is a side view illustrating a construction machine in accordance with example embodiments.
Figure 2:
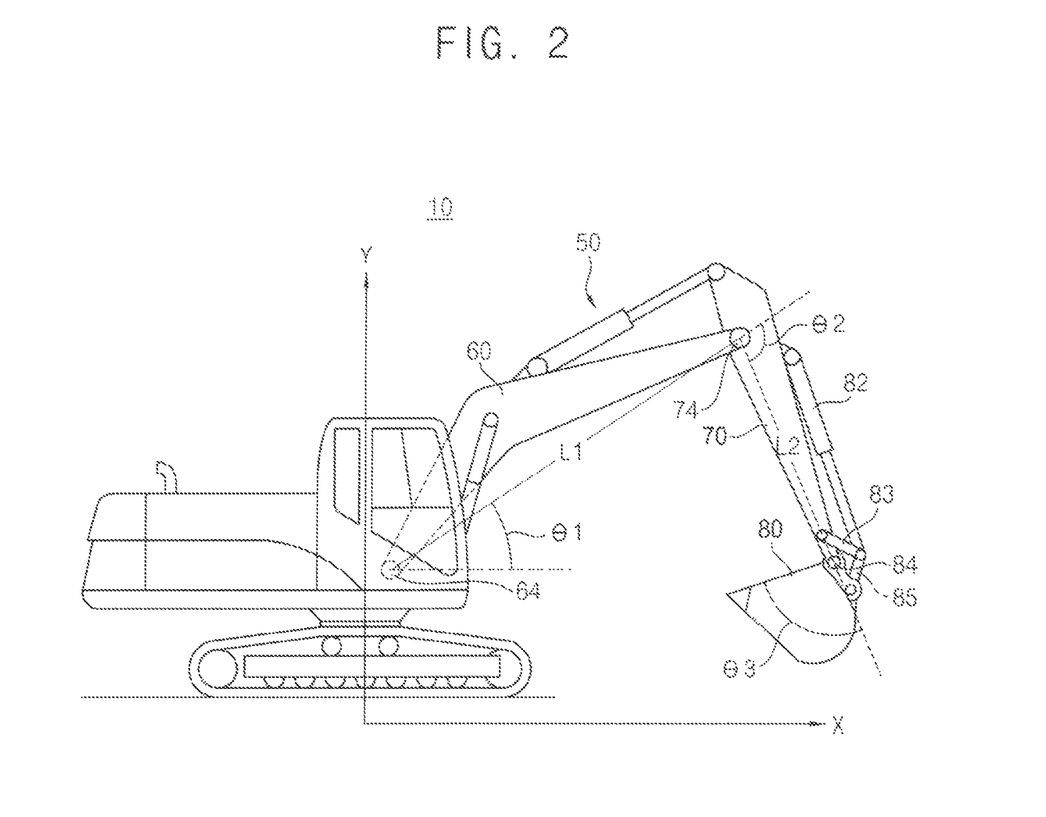
FIG. 2 is a diagram illustrating a three-dimensional cartesian coordinate system used in a method of measuring weight of a load in the construction machine of FIG. 1.
Figure 3:
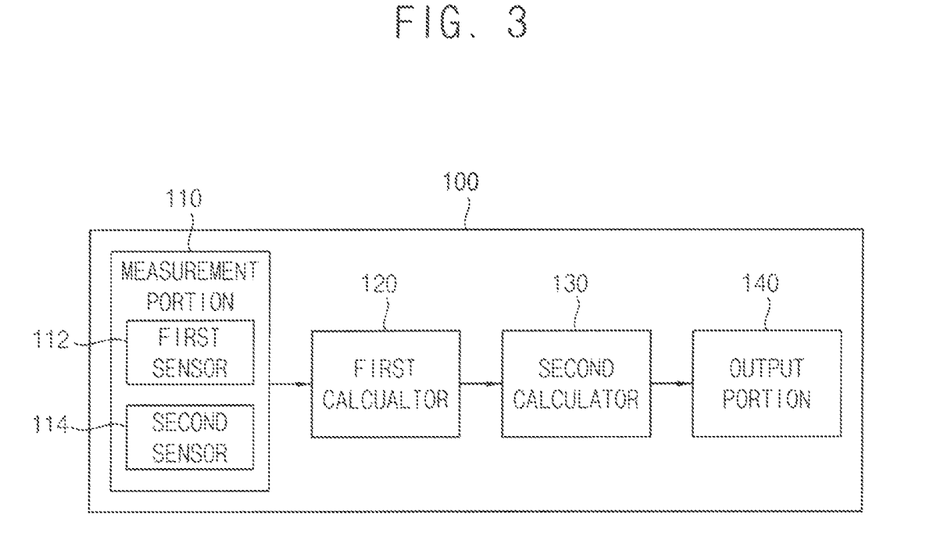
FIG. 3 is a block diagram illustrating a system for measuring weight of a load in the construction machine of FIG. 1.

FIG. 1 is a side view illustrating a construction machine in accordance with example embodiments. FIG. 2 is a diagram illustrating a three-dimensional cartesian coordinate system used in a method of measuring weight of a load in the construction machine of FIG. 1. FIG. 3 is a block diagram illustrating a system for measuring weight of a load in the construction machine of FIG. 1. Although an excavator is illustrated in FIGS. 1 to 3, the system for measuring the weight of the load in the construction machine according to example embodiments is not limited to being used only in the excavator, and it may be understood that example embodiments may be applied to other construction machine such as wheel loaders, forklifts, etc.

First, referring to FIGS. 1 and 2, a construction machine 10 may include a lower travelling body 20, an upper swinging body 30 mounted to be capable of swinging on the lower travelling body 20, and a cabin 40 and a front working apparatus 50 installed in the upper swinging body 30, and the front working apparatus may include a boom 60, an arm 70 and a bucket 80.

The boom 60 may be connected to the upper swinging body 30 through a boom pin 64, a boom cylinder 62 for controlling a movement of the boom 60 may be installed between the boom 60 and the upper swinging body 30, and the boom 60 and the boom cylinder 62 may be connected to each other by a boom cylinder connecting portion 66. The boom 60 and the arm 70 may be connected to each other by an arm pin 74, an arm cylinder 72 for controlling a movement of the arm 70 may be installed between the boom 60 and the arm 70, and the arm 70 and the arm cylinder 72 may be connected to each other by an arm cylinder connecting portion 76. The arm 70 and the bucket 80 may be connected to each other by a bucket pin 84, a bucket cylinder 82 for controlling a movement of the bucket 80 may be installed between the arm 70 and the bucket 80, and the bucket 80 and the bucket cylinder 82 may be connected to each other by a bucket cylinder connecting portion 86.

In example embodiments, the bucket 80 and the bucket cylinder 82 may be connected to each other in a 4-bar linkage structure, and a guide link 83 and a push link 85 may be installed between the bucket 80 and the bucket cylinder 82. At this time, an end portion of the guide link 83 may be connected to a portion of the arm 70, and another end portion of the guide link 83 may be simultaneously connected to the bucket cylinder 82 and an end portion of the push link 85, and another end portion of the push link 85 may be connected to the bucket 80.

As the boom cylinder, the arm cylinder and the bucket cylinder expand or contract, the boom, the arm and the bucket may implement various movements, to thereby perform various works.

Here, various attachments other than the bucket 80 may be attached to the working apparatus 50 depending on the purpose of the work. Hereinafter, for convenience of explanation, only the case where the attachment is the bucket 80 will be described.

Referring again to FIG. 2, the boom 60 may have a first angle $\theta 1$ with respect to the horizontal plane according to the movement of the boom 60, the arm 70 may have a second angle $\theta 2$ with respect to a first straight line L1, which is an imaginary extension line connecting the pin 64 and the arm pin 74, according to the movement of the arm 70, and the bucket 80 may have a third angle $\theta 3$ with respect to the second straight line L2, which is an imaginary extension line connecting the arm pin 74 and the bucket pin 84, according to the movement of the bucket 80. In this case, the horizontal plane may be a plane perpendicular to the direction of gravity.

For example, when the construction machine 10 performs work on a slope, the first angle $\theta 1$ of the boom 60 may be the sum of an angle of the ground with respect to the horizontal plane, that is, an inclination angle of the ground and the angle of the boom 60 with respect to the ground.

Referring to FIG. 3, a loading weight measurement system 100 for measuring weight of a load may include a measurement portion 110, a first calculator 120, a second calculator 130 and an output portion 140.

In example embodiments, the measurement portion 110 may include a plurality of sensors. For example, the measurement portion 110 may include at least one first sensor 112 for sensing a length or angle of each of the boom 60, the arm 70 and the bucket 80, and at least one second sensor 114 for sensing pressure of each of the boom cylinder 62, the arm cylinder 72 and the bucket cylinders 82.

The first sensor 112 may be installed in the boom pin 64, the arm pin 74 and the bucket pin 84 to measure the first to third angles ($\theta 1$, $\theta 2$, $\theta 3$). Alternatively, the first sensor 112 may be installed at any suitable position of the working apparatus 50 to measure the length of each of the boom 60, the arm 70 and the bucket 80, and thus the angle of each of the boom 60, the arm 70 and the bucket 80 may be calculated using the measure length.

Meanwhile, although it is illustrated in in FIG. 3 that the measurement portion 110 of the loading weight measurement system 100 includes one first sensor 112, it may not be limited thereto. For example, the measurement portion 110 may further include one or a plurality of sensors of different type than the first sensor 112, and the different types of sensors may be installed in components other than the boom pin 64, the arm pine 74 and the bucket pin 84 of the construction machine 10. In an embodiment, the measurement portion 110 may include an Inertial Measurement Unit (IMU) type sensor and/or a Hall sensor using a Hall effect.

For example, the hall sensor may be installed in the boom pin 64, the arm pin 74 and the bucket pin 84, which are rotation shafts of the boom 60, the arm 70 and the bucket 80, and the first to third angles (θ1, θ2, θ3) of the boom 60, arm 70, and bucket 80 may be measured by using a magnetic field change according to the rotation of the boom 60, the arm 70 and the bucket 80. The measured angles may be inputted to the first calculator 120.

The second sensor 114 may include a pressure sensor installed in a pipe connected to the boom cylinder 62 to measure the thrust of the boom cylinder 62. Here, the thrust of the boom cylinder 62 may be obtained by subtracting product of rod-side pressure and rod-side cross-sectional area from product of head-side pressure and head-side cross-sectional area. The measured pressure of the boom cylinder 62 may be inputted to the first calculator 120.

The first calculator 120 may calculate a link parameter related to the working apparatus of the construction machine 10 by using the information inputted from the measurement portion 110.

For example, the first calculator 120 may receive angles ($\theta_{Boom}$, $\theta_{Arm}$, $\theta_{Bucket}$) or lengths of the boom 60, the arm 70 and the bucket 80 from the measurement portion 110, and the pressures of the boom cylinder 62, the arm cylinder 72 and the bucket cylinder 82, respectively, and the first calculator 120 may calculate the link parameter using the received values.

In example embodiments, the first calculator 120 may calculate the link parameters through a dynamic equation using values measured for angle and angular velocity of each of the boom 60, the arm and the bucket 80, and values measured for the head-side pressure and the rod-side pressure of each of the boom cylinder 62, the arm cylinder 72 and the bucket cylinder 82.

Alternatively, the first calculator 120 may calculate the link parameters through the dynamic equation using values obtained by measuring the length and velocity of each of the boom 60, the arm 70 and the bucket 80, and values measure for the head-side pressure and the rod-side pressure of each of the boom cylinder 62, the arm cylinder 72 and the bucket cylinder 82.

In an embodiment, the dynamic equation may include Equation 1 below.

$$\tau_i(t) = \sum_{j=1}^{4} D_{ij} \cdot \ddot{\theta}_j(t) + h_i^{tran}(\theta, \dot{\theta}) + h_i^{rot}(\theta, \dot{\theta}) + c_i \quad \text{[Equation 1]}$$

Here, τi is driving torque of each working apparatus, Dij is a matrix representing inertia, joint variables and functions of the inertia parameter of each working apparatus, θ is a relative angle of each working apparatus, $\dot{\theta}$ is an angular velocity of each working apparatus, and $\ddot{\theta}$ is an angular acceleration of each working apparatus. $hi^{tran}$ is a combined centrifugal and Coriolis reaction torques in the joint due to the velocity according to the translational motion of the connecting portion of each working apparatus, and $hi^{rot}$ is combined centrifugal and Coriolis reaction torques in the joint due to the velocity according to the rotational motion of each working apparatus. ci is torque due to gravity acting on the working apparatus 50 of the boom 60, the arm 70 and the bucket 80 from the connecting portion on the joint. In one embodiment, θ is the first to third angles (θ1, θ2, θ3) of the boom 60, the arm 70 and the bucket 80, $\dot{\theta}$ is the angular velocity of the boom 60, the arm 70 and the bucket (80), and $\ddot{\theta}$ may be the angular acceleration of the boom 60, the arm 70 and the bucket 80.

Meanwhile, in order to calculate the link parameter of the construction machine 10, various equations may be used in addition to or instead of the method using the above Equation 1.

Then, the link parameter calculated from the first calculator 120 may be inputted to the second calculator 130, and the second calculator 130 may compare a pre-stored link parameter (hereinafter, referred to as a previous link parameter) and a newly calculated link parameter (hereinafter, referred to as a new link parameter) to determine whether to update. A description of the step of determining whether to update the link parameter will be described later.

For example, when the previous link parameter is updated with the new link parameter, the second calculator 130 may calculate the weight of the load based on the new link parameter. On the other hand, when the previous link parameter is not updated with the new link parameter, the second calculator 130 may calculate the weight of the load based on the previous link parameter. In this case, various equations generally known in the art may be used for calculating the weight of the load.

Hereinafter, a method of measuring weight of a load in the construction machine 10 using the loading weight measurement system of FIG. 3 will be described.

Figure 4:
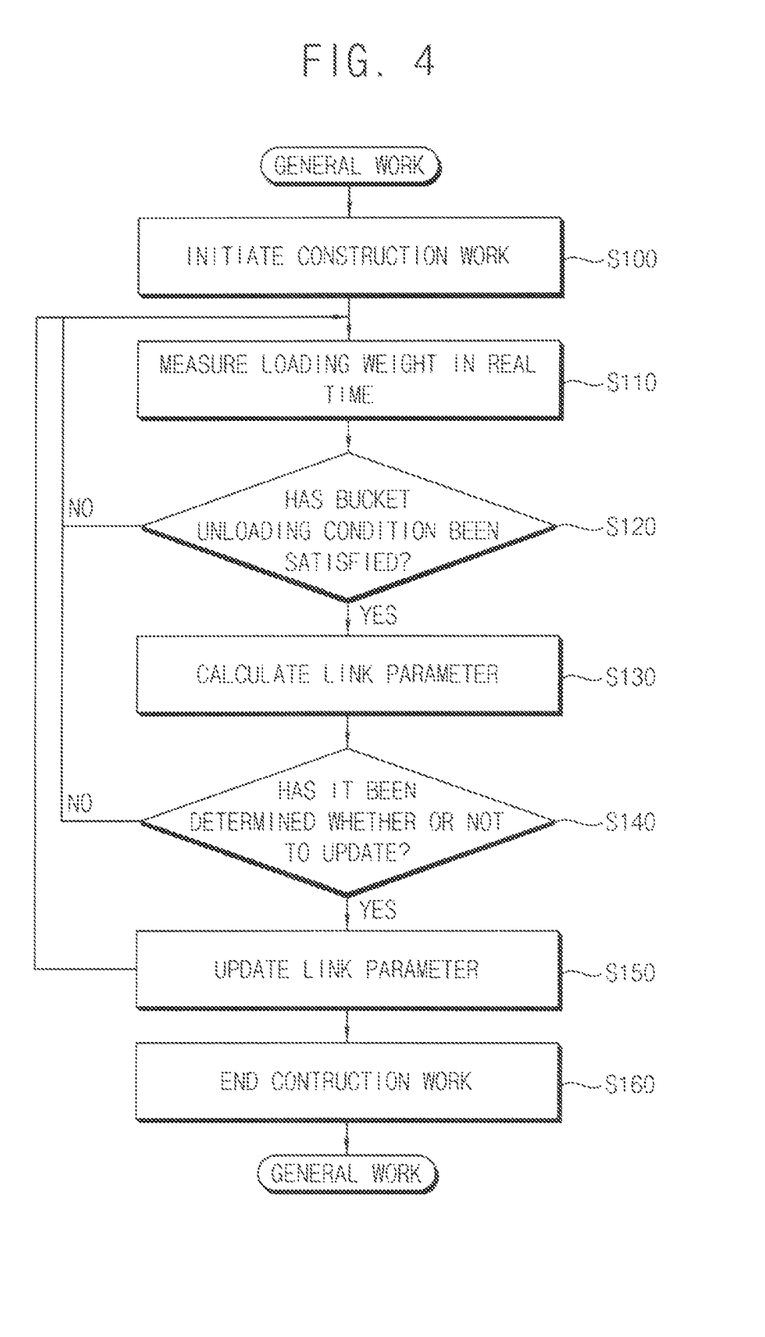
FIG. 4 is a flowchart illustrating a method of measuring weight of a load in a construction machine in accordance with example embodiments.

FIG. 4 is a flowchart illustrating a method of measuring weight of a load in a construction machine in accordance with example embodiments.

Referring to FIG. 4, a general work may be performed using a construction machine 10, and a construction work may be performed after the general work (S100). For example, the general work may include a driving operation, and the construction work (S100) may include an excavation operation, a loading operation and a leveling operation, etc.

While performing the construction work (S100), weight of a load loaded on a working apparatus 50 of the construction machine 10 may be measured in real time (S110). In this case, the real-time loading weight measurement step (S110) may be performed by using a difference between a previous link parameter value and a new link parameter value.

Then, whether a load is loaded in the bucket 80 or whether an external force is acting during the construction work (hereinafter, referred to as 'whether or not a bucket unloading condition is satisfied') may be determined (S120), when the bucket unloading condition is satisfied, a new link parameter value may be calculate (S130), and whether to update the link parameter may be determined (S140).

When no load is loaded in the bucket 80 or no external force is applied to the working apparatus 50, it may be determined that the bucket unloading condition is satisfied. Alternatively, whether the bucket unloading condition is satisfied may be determined by comparing the new link parameter calculated through output values from the sensors with the previous link parameter.

In particular, whether or not the bucket unloading condition is satisfied (S120) may be determined by measuring the angle and the angular velocity of each of the boom 60, the arm 70 and the bucket 80 or the length and the velocity of each of the boom 60, the arm 70 and the bucket 80 through the first sensor 112, measuring the head-side pressure and the rod-side pressure of each of the boom cylinder 62, the arm cylinder 72 and the bucket cylinder 82 through the second sensor 114 and applying the measured values to the dynamic equation. In this case, the dynamic equation may require various variables such as angle, angular velocity, length, speed, pressure, center of gravity, etc. of other parts of the working apparatus 50 in addition to the pressure of the boom cylinder 62. Accordingly, whether the bucket is unloaded may be determined based on a change value of the previously stored link parameter, that is, the previous link parameter.

In the step of calculating the new link parameter (S130), it may be determined whether or not the load is loaded at any point in the construction work, and if the working apparatus operates in a situation where it is determined that there is no load, the operation of the working apparatus may be detected, and the operation detection may be stopped at the moment when it is determined that an external force is applied to the working apparatus, and data measured up to this point may be analyzed to calculate a new link parameter of the working apparatus of an excavator. In this case, the calculation of the new link parameter may be performed by the first calculator 120 of the loading weight measurement system 100.

When the bucket unloading condition is satisfied, output values (data a, data b, data c, data d) may be collected from the sensors in a plurality of operation states (e.g., operation state A, operation state B, operation state C, operation state D) of the working apparatus 50 respectively, and the new link parameter may be calculated by applying the collected output values to the dynamic equation.

In the step of determining whether to update the link parameter (S140), it may be determined whether an error occurs over a specific range between the newly calculated new link parameter value and the previous link parameter value used in the previous work, and whether the error occurs constantly. In this case, whether the error occurs and whether the error occurs constantly may be performed by the second calculator 130 of the loading weight measurement system 100.

For example, when an error between the new link parameter value and the previous link parameter value occurs within a specific range or non-constantly, the previous link parameter value may not be replaced with the new link parameter value. That is, in this case, since the error is interpreted as occurring within an acceptable range or not occurring at all, the previous link parameter may be maintained and used for real-time loading weight measurement (S110).

On the other hand, when an error between the new link parameter value and the previous link parameter value occurs consistently over a specific range, the previous link parameter value may be updated, that is, replaced and stored with the new link parameter value (S150). In this case, the error may occur according to a change in the surrounding environment.

After the link parameter update step (S150), the weight of the load loaded in the bucket 80 of the construction machine 10 may be measured in real time based on the updated new link parameter value (S160), and it may be possible to continue to perform the construction work based on the measure weight of the load (S170).

According to the above-described system and method for measuring the weight of the load in the construction machine, in the real-time loading weight measurement performed during the construction work, the link parameters may be automatically updated without entering a separate calibration mode, and it may be possible to measure the weight of the load loaded on the construction machine based on the link parameter updated in real time. Accordingly, a user of the construction machine may not need to manually perform a calibration work, and because the user does not need to additionally perform the calibration work other than the construction work, the construction work time may be shortened. Further, by accurately grasping the weight of the load loaded on the construction machine during the construction work, the construction machine may be prevented from being overloaded and the rated capacity may be complied to thereby reduce the maintenance cost of the construction machine.

The present invention has been explained with reference to preferable embodiments, however, those skilled in the art may understand that the present invention may be modified or changed without being deviated from the concept and the scope of the present invention disclosed in the following claims.

| <The description of the reference numerals> | |
|---|---|
| 10: | construction machine |
| 20: | lower travelling body |
| 30: | upper swinging body |
| 40: | cabin |
| 50: | working apparatus |
| 60: | boom |
| 62: | boom cylinder |
| 64: | boon pin |
| 66: | boon cylinder connecting portion |
| 70: | arm |
| 72: | arm cylinder |
| 74: | arm pin |
| 76: | arm cylinder connecting portion |
| 80: | bucket |
| 82: | bucket cylinder |
| 84: | bucket pin |
| 86: | bucket cylinder connecting portion |
| 100: | loading weight measurement system |
| 110: | measurement portion |
| 112: | first sensor |
| 114: | second sensor |
| 120, 130: | first and second calculators |
| 140: | output portion |

The invention claimed is:

1. A method of measuring weight of a load in a construction machine, the method comprising:
   measuring weight of a load loaded in a bucket while performing a construction work using a working apparatus of the construction machine, the working apparatus including an arm and the bucket;
   determining whether or not a bucket unloading condition is satisfied at any point in time during the construction work;
   calculating a link parameter, as a new link parameter, using output values collected from sensors attached to the construction machine in response to the bucket unloading condition being satisfied, the link parameter being related to a linkage structure connecting the bucket to the arm of the working apparatus;
   comparing a difference between the new link parameter and a previous link parameter that has been used to measure the weight of the load, to update the previous link parameter with the new link parameter;
   measuring weight of the load loaded in the bucket based on the new link parameter; and
   performing the construction work based on the weight of the load measured based on the new link parameter, wherein determining whether the bucket unloading condition is satisfied includes determining that the bucket unloading condition is satisfied in response to no load being loaded in the bucket or no external force being acting on the working apparatus at any point in time during the construction work.

2. The method of claim 1, wherein determining whether the bucket unloading condition is satisfied includes comparing the new link parameter calculated through the output values from the sensors with the previous link parameter.

3. The method of claim 1, wherein calculating the new link parameter in response to the bucket unloading condition being satisfied includes:
   collecting the output values from the sensors when the working apparatus is operating; and
   calculating the new link parameter by applying the collected output values to a dynamic equation.

4. The method of claim 1, wherein calculating the new link parameter in response to the bucket unloading condition being satisfied includes:
   collecting the output values from the sensors in a plurality of operation states of the working apparatus; and
   calculating the new link parameter by applying the collected output values to a dynamic equation.

5. The method of claim 1, wherein the sensors include pressure sensors for measuring head-side pressure and rod-side pressure of each of cylinders of the working apparatus.

6. The method of claim 1, wherein determining whether the bucket unloading condition is satisfied includes determining that the bucket unloading condition is satisfied in response to no load being loaded in the bucket at any point in time during the construction work.

7. The method of claim 1, wherein determining whether the bucket unloading condition is satisfied includes determining that the bucket unloading condition is satisfied in response to no external force being acting on the working apparatus at any point in time during the construction work.

8. A method of measuring weight of a load in a construction machine, the method comprising:
   measuring weight of a load loaded in a bucket while performing a construction work using a working apparatus of the construction machine, the working apparatus including an arm and the bucket;
   determining whether or not a bucket unloading condition is satisfied at any point in time during the construction work;
   calculating a link parameter, as a new link parameter, using output values collected from sensors attached to the construction machine, the link parameter being related to a linkage structure connecting the bucket to the arm of the working apparatus;
   comparing a difference between the new link parameter and a previous link parameter that has been used to measure the weight of the load, to update the previous link parameter with the new link parameter;
   measuring weight of the load loaded in the bucket based on the new link parameter; and
   performing the construction work based on the weight of the load measured based on the new link parameter,
   wherein determining whether the bucket unloading condition is satisfied includes comparing a change value of the previous link parameter through the output values from the sensors, and
   wherein calculating the new link parameter in response to the bucket unloading condition being satisfied includes:
   collecting the output values from the sensors when the working apparatus is operating; and
   calculating the new link parameter by applying the collected output values to a dynamic equation.

* * * * *